2 Sheets—Sheet 1

A. W. COATS.
HORSE RAKE.

No. 68,288.        Patented Aug. 27, 1867.

Witnesses.

Inventor.

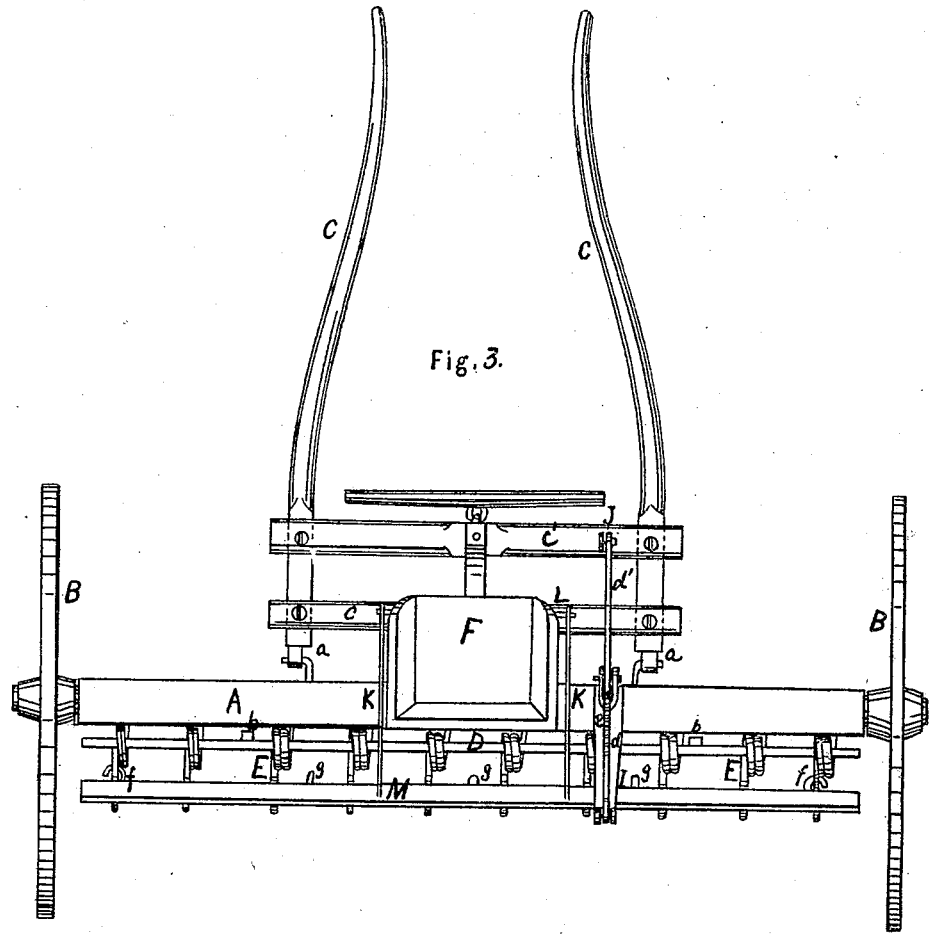

UNITED STATES PATENT OFFICE.

A. W. COATES, OF ALLIANCE, OHIO.

IMPROVEMENT IN HORSE-RAKES.

Specification forming part of Letters Patent No. 68,288, dated August 27, 1867.

*To all whom it may concern:*

Be it known that I, A. W. COATES, of Alliance, in the county of Stark and State of Ohio, have invented a new and Improved Horse-Rake; and I do hereby declare that the following is a full, clear, and exact description thereof, which will enable those skilled in the art to make and use the same, reference being had to the accompanying drawings, forming part of this specification, in which—

Figure 1:
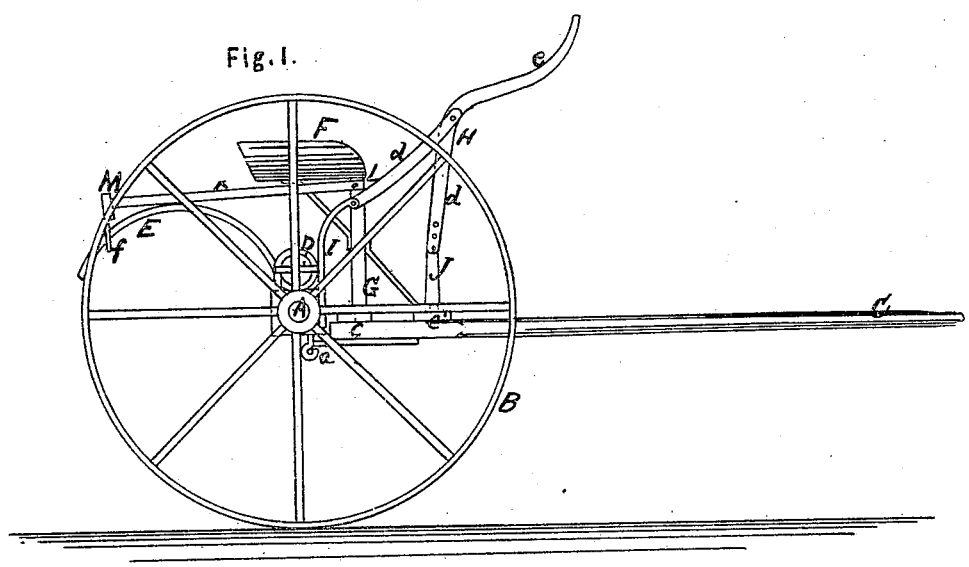
Figure 2:
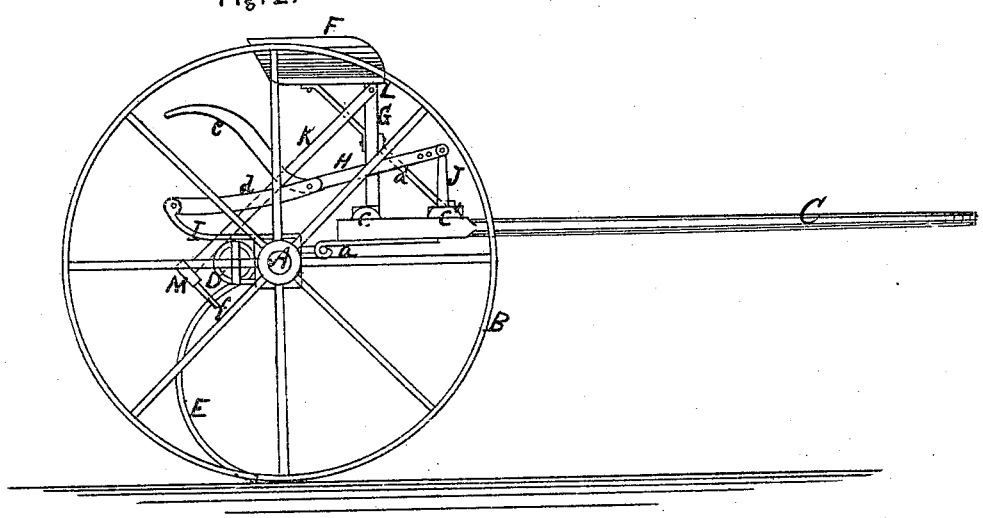

Figures 1 and 2 are side views of my invention; Fig. 3, a plan or top view of the same.

Similar letters of reference indicate corresponding parts.

This invention relates to a new and improved combination and arrangement of parts, as hereinafter fully shown and described, whereby a very simple horse-rake is obtained, one which will operate perfectly, and be capable of being manipulated with the greatest facility.

A represents an axle, having a wheel, B, placed loosely on each end of it, and thills C C, attached by joints *a a*. To the rear side of the axle A there are attached two or more projections, *b b*, to which a bar, D, is secured, said bar extending nearly the whole length of the axle, and having wire teeth E coiled around it, the ends of the coils passing into the rear of the axle, the bar D and teeth E being both secured to the axle.

F represents the driver's seat, which is attached to the upper end of a stud, G, secured to the rear cross-bar *c* of the thills, as shown in Figs. 1 and 2. H is a toggle, one arm, *d*, of which is pivoted to an arm, I, secured to the axle A, and the other arm, *d'*, pivoted to an upright, J, on the front cross-bar *c'* of the thills, the rear part of the arm *d'* of the toggle being curved upward to form a handle, *e*, for the convenience of operating the same. The arm *d'* is provided at its outer or front end with a series of holes, and is connected to the upright J by a removable pin, in such a manner that the bar *d'* may be moved forward or back any required distance to regulate the height of the teeth from the ground.

By means of this adjustability of the arm *d'* it is always retained in the same line with the arm *d*.

K K represent two arms, the front ends of which are fitted loosely on the ends of a bar, L, attached to the under side of the front part of the seat F, and M is a bar which is secured to the rear ends of the arms K K, the bar L being also provided with pendent pins *g*, which pass down between the rake-teeth.

The operation is as follows: When the rake is at work, the toggle H is down—that is to say, the arms *d d'* are in line with each other, or nearly so, (see Fig. 2,) and the lower ends of the rake-teeth E in contact with the surface of the ground, the rake-teeth being prevented from casually rising, in consequence of the arms of the toggle having that position. When the rake has gathered up its load, the driver, from his seat F, raises or draws upward the handle *e*, and thereby raises the inner ends of the arms *d d'* of the toggle, and raises the rake-teeth E, the bar M working over the teeth toward their rear ends, and insuring the discharge of the hay.

This raising of the rake-teeth, in order that the hay may be discharged, is facilitated by the weight of the driver on seat F, the stud G of which being on the rear cross-bar of the thills causes the gravity of the driver to have a tendency to turn the axle.

I am aware that the toggle has been previously used on horse-rakes for the purpose of elevating the rake, in order that it may discharge its load, and for keeping the rake down to its work, and I therefore do not claim the toggle separately, or in itself considered; but I do claim as new and desire to secure by Letters Patent—

The toggle H, constructed as described, whereby the rake-teeth are held down when the arms *d d'* are in line, or nearly so, with each other, and lifted by drawing up the handle *e*, which raises the inner end of the arms *d d'*, the weight of the driver assisting, substantially as herein shown and described.

A. W. COATES.

Witnesses:
JOSEPH BARNABY,
JAS. AMERMAN.